T. F. MORSE.
GRAIN HEATER.
APPLICATION FILED APR. 7, 1911.

1,088,357.

Patented Feb. 24, 1914.

Witnesses.
A. T. Dimond.
C. C. Easterbrooks.

Inventor.
Theodore F. Morse,
By Wilhelm, Parker & Hand,
Attorneys.

UNITED STATES PATENT OFFICE.

THEODORE F. MORSE, OF SILVER CREEK, NEW YORK, ASSIGNOR TO HUNTLEY MANUFACTURING COMPANY, OF SILVER CREEK, NEW YORK.

GRAIN-HEATER.

1,088,357.  Specification of Letters Patent.  Patented Feb. 24, 1914.

Application filed April 7, 1911. Serial No. 619,580.

*To all whom it may concern:*

Be it known that I, THEODORE F. MORSE, a citizen of the United States, residing at Silver Creek, in the county of Chautauqua and State of New York, have invented a new and useful Improvement in Grain-Heaters, of which the following is a specification.

This invention relates more particularly to improvements in grain heaters of that type in which the grain flows through a plurality of upright heating tubes which are arranged in a heating drum or chamber and extend from end to end thereof. In heaters of this type much difficulty has been experienced in producing an uninterrupted flow of grain through the tubes and in uniformly heating all of the grain. The stream of grain in the tube tends to flow more rapidly in the central portion thereof than at the sides, due to the friction between the grain and the walls of the tube. The grain in the center of the tube is also more or less insulated from the hot walls of the surrounding grain, and owing to this and its more rapid flow, it is heated to a less extent than the slower flowing grain which is adjacent to the side walls of the tubes. If the tube is hot enough to properly heat the grain in the center, the grain along the sides tends to become overheated and scorched. Attempts have been made to remedy this, by placing in the tubes various kinds of baffle rods having laterally extending baffles which are intended to deflect the grain in the central portion of the tubes outwardly toward the sides thereof. These rods have been found in actual use to be unsuccessful as they cause the grain to clog between the baffle portions of the rod and the walls of the tube and thus choke the tube, thereby causing the grain to become scorched and impeding the flow of the grain to such an extent as to materially lessen the capacity of the heater.

The object of this invention is to overcome these difficulties by providing deflecting devices in the tube of simple and economical construction which will effectually break up the stream of grain flowing through the tube and deflect the central portion thereof outwardly toward the walls of the tube or cause the grain to constantly shift and change its position in the tube so that the grain will become uniformly heated throughout, without interfering with the uninterrupted flow of grain through the tubes.

Figure 1:
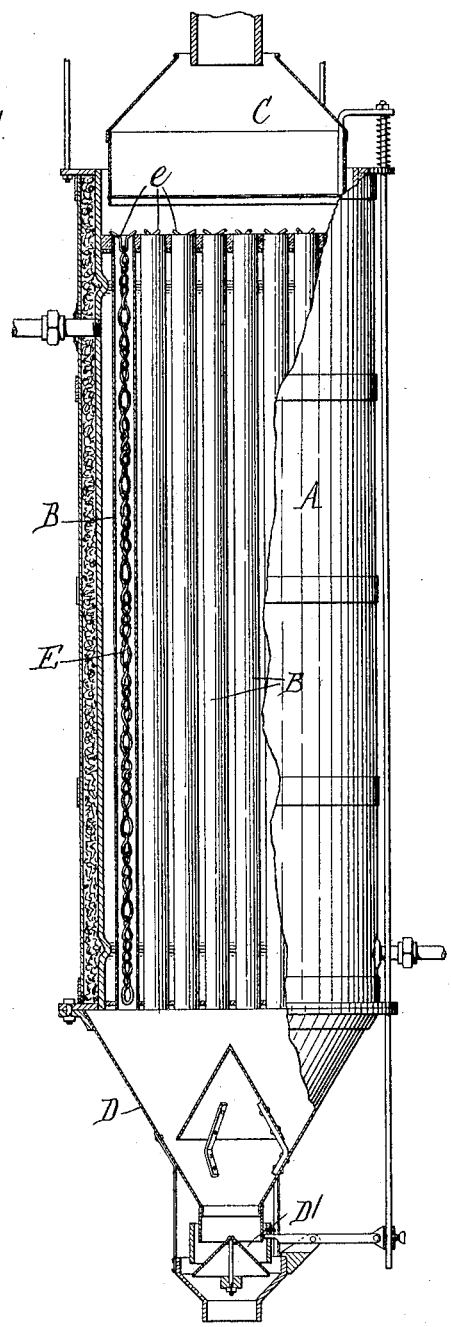
Figure 2:
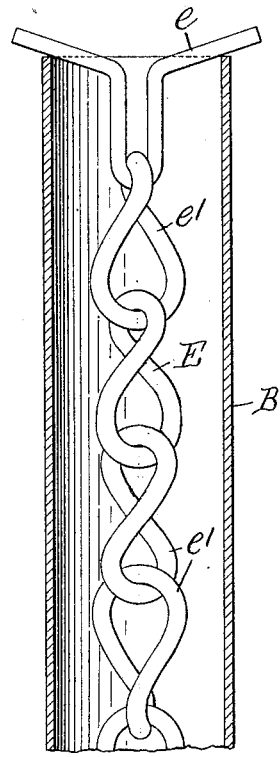

In the accompanying drawings: Figure 1 is a side elevation, partly in section, of a grain heater embodying the invention, portions being broken away to show the deflector in one of the tubes. Fig. 2 is a fragmentary sectional elevation of the upper portion of one of the tubes and its deflector.

Like reference characters refer to like parts in the several figures.

The heating apparatus shown is of usual construction with the exception of the deflector, consisting of a heating drum A having a plurality of upright open-ended tubes B extending through the same, a feed hopper C above the drum for feeding the grain to the different tubes, and a discharge hopper D below the drum for receiving and discharging the grain which flows through the tubes. The discharge hopper is provided, as usual, with a valve D' for automatically regulating the discharge from the hopper in accordance with the feed of grain to the heater. These parts may be constructed and arranged in any suitable and desirable manner.

Within each of the tubes B is arranged a flexible deflector E which is preferably suspended to hang centrally of the tube from a suitable support, such as the looped crossbar $e$ which rests upon the upper end of the tube. The deflector may be of any suitable construction composed of a series of links or deflecting parts which are movably connected together so that they can move or swing relative to each other. In the construction shown, the deflector consists of a chain having "twisted" links $e'$, that is, links which have been given a partial twist or turn so that their sides and ends occupy different planes. The links of the chain standing at various angles to one another serve to throroughly break up and intermingle the stream of grain and deflect the central portion of the stream outwardly toward the walls of the tube. Owing to the twisted character of this construction, the links tend to cause a somewhat spiral movement of the grain passing through the tubes which produces a constant agitation and shifting of the particles of grain during their passage down the tube. All of the grain is thus repeatedly brought into more or less intimate contact with the hot walls of the tube. This produces a thorough and uniform heating of all of the grain without permitting the grain to remain at any time in contact with the walls of the tube a sufficient length of time to become overheated or scorched.

Owing to the flexibility of the chain, it is practically impossible for the grain to wedge or clog between the links and the walls of the tube and choke the tube. Any excessive quantity of material on one side of the chain will cause the chain to shift its position in the tube and make room for the passage of the material. Each link, being free to swing and turn laterally to a limited extent on its adjoining links, can shift its position in accordance with the varying pressures of the grain on the different sides thereof and thus prevent the grain from wedging between the link and the walls of the tube.

The deflector is exceedingly simple and inexpensive in construction. Chains of standard shapes and sizes can be used and these can be easily and quickly placed in the tubes so that the heater can be equipped with the deflectors at small expense.

I claim as my invention:

1. In a grain heater having a plurality of upright heating tubes through which the grain is adapted to flow by gravity, a deflector for the grain suspended centrally in each tube and consisting of a series of deflecting parts connected one above the other, said deflecting parts being joined together by loose connections which permit each part to freely shift laterally relatively to the adjacent parts, substantially as set forth.

2. In a grain heater having a plurality of upright heating tubes through which the grain is adapted to flow by gravity, a deflector for the grain suspended centrally in each tube and consisting of a series of deflecting parts arranged one above the other, each deflecting part forming a movable connection between the adjacent deflecting parts located above and below the same and having a substantially free lateral movement in various directions relative to adjacent deflecting parts, substantially as set forth.

3. In a grain heater having a heating tube through which the grain is adapted to flow by gravity, a grain deflector arranged in the tube and consisting of a series of deflecting parts, the adjacent deflecting parts of said series being loosely linked together whereby each part is free to shift its position in the tube relative to its adjacent parts, substantially as set forth.

4. In a grain heater having an upright heating tube through which the grain is adapted to flow, a deflector consisting of a chain which is arranged in the tube and is composed of a series of movably connected open links, substantially as set forth.

5. In a grain heater having an upright heating tube through which the grain is adapted to flow, a deflector consisting of a chain which is arranged in the tube and is composed of a series of movably connected deflecting links which occupy different positions relative to one another, substantially as set forth.

6. In a grain heater having an upright heating tube through which the grain is adapted to flow, a deflector consisting of a chain which is arranged in the tube and is composed of a series of movably connected twisted links, substantially as set forth.

Witness my hand, this 1st day of April, 1911.

THEODORE F. MORSE.

Witnesses:
 A. L. McGEE,
 C. W. PARKER.

Copies of this patent may be obtained for five cents each, by addressing the "Commissioner of Patents, Washington, D. C."